(12) United States Patent
Perttilä et al.

(10) Patent No.: US 9,309,077 B2
(45) Date of Patent: Apr. 12, 2016

(54) APPARATUS FOR RECEIVING AND POSITIONING VENEERS FED IN A POSITION WITH CAMERA

(75) Inventors: Marko Perttilä, Nastola (FI); Pertti Auvinen, Hollola (FI); Pekka Runonen, Vantaa (FI)

(73) Assignee: Raute Oyj, Nastola (FI)

( * ) Notice: Subject to any disclaimer, the term of this patent is extended or adjusted under 35 U.S.C. 154(b) by 806 days.

(21) Appl. No.: 13/495,401

(22) Filed: Jun. 13, 2012

(65) Prior Publication Data

US 2012/0328405 A1 Dec. 27, 2012

(30) Foreign Application Priority Data

Jun. 15, 2011 (FI) ...................... 20115601

(51) Int. Cl.
*B65H 9/20* (2006.01)
*B65H 7/08* (2006.01)
*B65H 9/12* (2006.01)
*B23Q 7/14* (2006.01)
*B65H 9/06* (2006.01)
*B65H 11/00* (2006.01)
*B23Q 17/24* (2006.01)
*B65H 5/10* (2006.01)
*B23Q 1/60* (2006.01)
*B23Q 3/06* (2006.01)
*B23Q 3/00* (2006.01)

(52) U.S. Cl.
CPC .. B65H 9/20 (2013.01); B65H 7/08 (2013.01); B65H 9/12 (2013.01); *B23Q 1/601* (2013.01); *B23Q 3/007* (2013.01); *B23Q 3/062* (2013.01); *B23Q 7/1494* (2013.01); *B23Q 17/24* (2013.01); *B65H 5/10* (2013.01); *B65H 9/06* (2013.01); *B65H 11/007* (2013.01); *B65H 2511/20* (2013.01); *B65H 2511/242* (2013.01); *B65H 2511/512* (2013.01); *B65H 2701/1311* (2013.01); *B65H 2701/1938* (2013.01)

(58) Field of Classification Search
CPC .......... B65H 9/06; B65H 9/12; B65H 11/007; B65H 5/10; B23Q 1/601; B23Q 3/007; B23Q 3/062; B23Q 7/1494; B23Q 17/24
USPC ............... 414/749.3, 774, 775, 783; 271/228, 271/234, 235, 243, 244; 198/345.1; 144/253.9
See application file for complete search history.

(56) References Cited

U.S. PATENT DOCUMENTS

| 4,228,886 A | * | 10/1980 | Moran ........................... 271/227 |
| 4,666,492 A | * | 5/1987 | Thimons et al. ................. 294/65 |
| 4,897,018 A | * | 1/1990 | Nakaoda et al. ........... 414/789.6 |

(Continued)

FOREIGN PATENT DOCUMENTS

| DE | 4114284 A1 * | 11/1992 | ............... B23Q 3/18 |
| JP | 2008-080658 A | 4/2008 | |

*Primary Examiner* — Gerald McClain
(74) *Attorney, Agent, or Firm* — Womble Carlyle Sandridge & Rice LLP

(57) ABSTRACT

An apparatus is provided for receiving and positioning veneers fed by a conveyor belt. The apparatus includes grippers controlled to be independently movable, for gripping the veneers, and detection means for detecting the location and/or position of the veneers on a conveyor belt. At least one gripper is disposed on both sides of the feeding direction center line of the veneer. The grippers are arranged to reciprocate at least in the feeding direction of the veneers, to grip each successive veneer on its leading edge side, and to align the leading edge side of the veneer to correspond to the position of the veneer in the veneer assembly, in response to information provided by the detection means.

7 Claims, 4 Drawing Sheets

(56) References Cited

U.S. PATENT DOCUMENTS

| | | | |
|---|---|---|---|
| 6,378,862 B1* | 4/2002 | Rebeaud | 271/243 |
| 8,061,500 B2* | 11/2011 | Baccini | 198/345.1 |
| 8,790,064 B2* | 7/2014 | Dorner et al. | 414/783 |
| 2010/0154218 A1 | 6/2010 | Turulin | |
| 2011/0057384 A1* | 3/2011 | Perttil | B65H 7/06 271/227 |

* cited by examiner

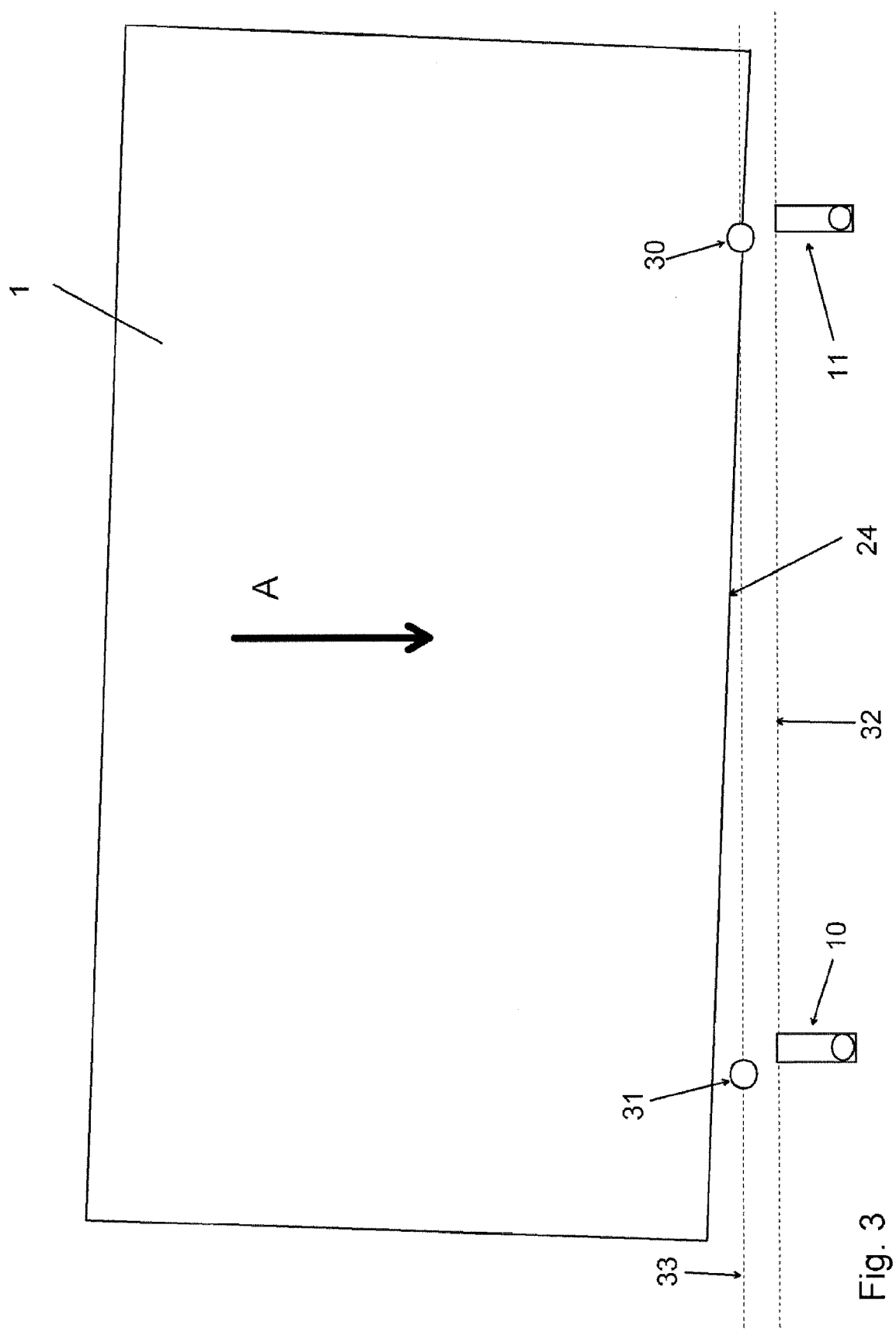

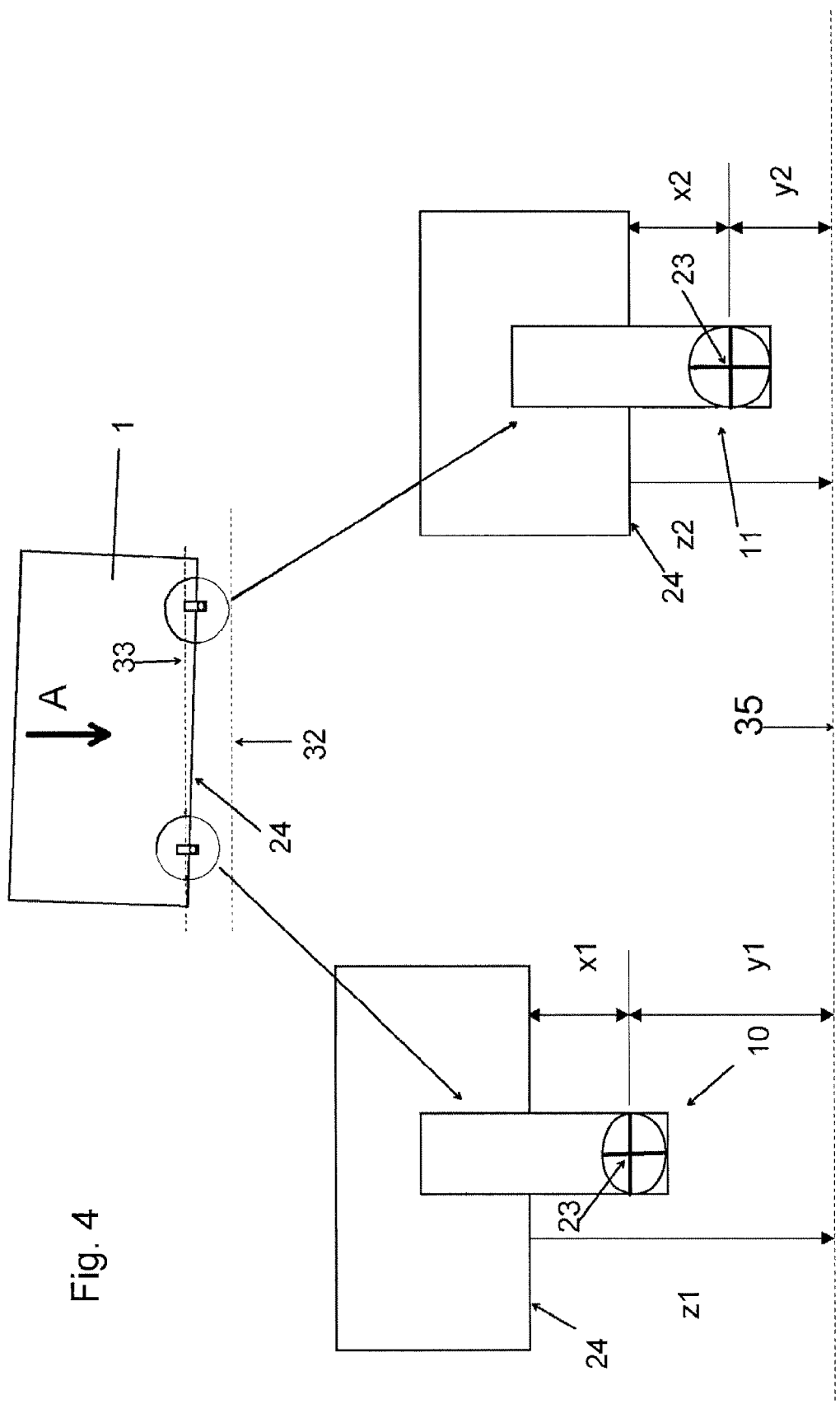

APPARATUS FOR RECEIVING AND POSITIONING VENEERS FED IN A POSITION WITH CAMERA

CROSS-REFERENCE TO RELATED APPLICATIONS

This application claims priority from and the benefit under 35 U.S.C. §119 of Finnish Patent Application No. 20115601, filed Jun. 15, 2011, in the Finnish Patent Office, which is hereby incorporated herein by reference in its entirety.

BACKGROUND OF THE DISCLOSURE

1. Field of the Disclosure

The present invention relates to an apparatus for receiving and positioning veneers fed by conveyor means in a desired position, the apparatus comprising means for gripping the veneers and means for detecting the location and/or position of the veneers on a conveyor belt, there being at least one of the said gripping means on both sides of the feeding direction centre line of the veneer.

2. Description of Related Art

In the Applicant's Finnish patent application FI 20095931 is described a method for the optimal positioning of veneer sheets at a lay-up station, where the veneer sheets are piled on top of one another into a veneer assembly comprised of glued veneer sheets. In said method, the optimal position and the virtual locations of the alignment edges of each veneer sheet are determined, and the veneer sheets are piled by positioning them in accordance with the virtual alignment edges into a veneer assembly.

This method functions in the intended manner as such, but one of its problems is a relatively short cycle time due to the structure of the supporting arms (robot arms). Furthermore, determining the location of the supporting arms requires real-time calculation which may lead to errors.

SUMMARY OF THE DISCLOSURE

The aim of the present invention is to provide an improved solution for receiving and positioning veneer sheets, the said solution also being applicable elsewhere on the veneer production line than at the lay-up station. To achieve this aim, the solution according to the invention is characterized in that the detection means comprise a camera, and that the gripping means are arranged to reciprocate essentially in the feeding direction of the veneers and to grip the veneer on its front edge side and to position the veneer on the basis of the information provided by the camera to the desired location in the feeding direction of the veneers. If necessary, the apparatus is also arranged to carry out the aligning of the veneers before positioning and/or at the positioning stage.

BRIEF DESCRIPTION OF THE SEVERAL VIEWS OF THE DRAWING(S)

The invention will now be described more closely with reference to the accompanying drawings, in which:

FIGS. 3 and 4 illustrate, as a diagrammatic view in principle, positioning carried out by means of photocells.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Figure 1:
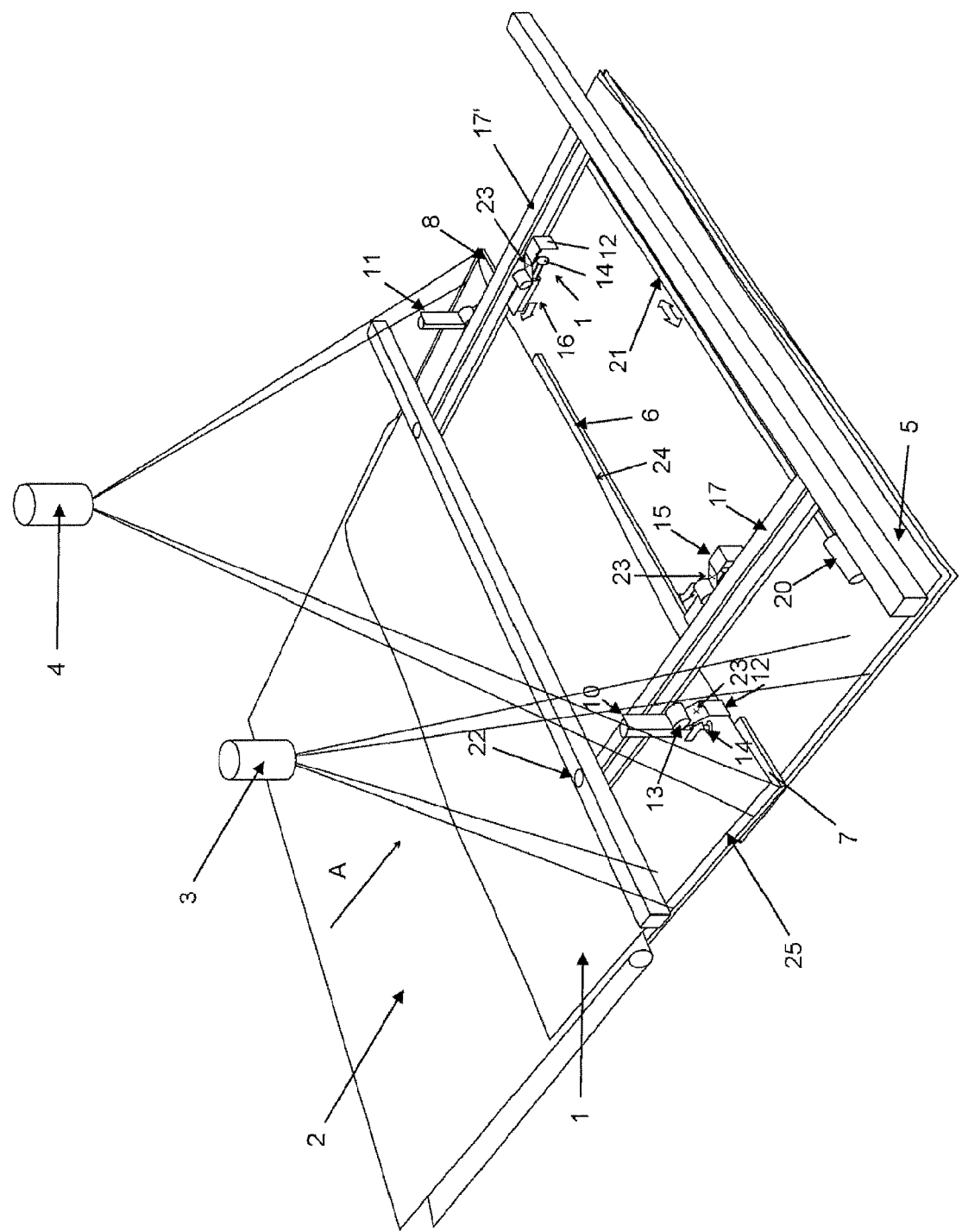
FIG. 1 shows a diagrammatic view in principle of an embodiment of the apparatus according to the invention.

In the embodiment shown, the apparatus of FIG. 1 comprises rails 17, 17' extending in the feeding direction A of the veneers 1 fed by the conveyor 2, the rails being located at a point on both sides of the centre line of the feeding direction of the veneers, preferably in the vicinity of the end edges 25 of the veneers. In connection with both rails are provided two gripping means 10, 15 and 11, 16, respectively, for moving on both sides of the rail. These double grippers are provided to shorten the cycle time, whereby while two of the grippers 10 and 11 are gripping the front edge 24 of the veneer, the other two grippers 15 and 16 return to the initial position in order to be ready to receive the next veneer. The grippers turn about a pivoted shaft 13 into an essentially horizontal position for the duration of the return travel.

Figure 2:
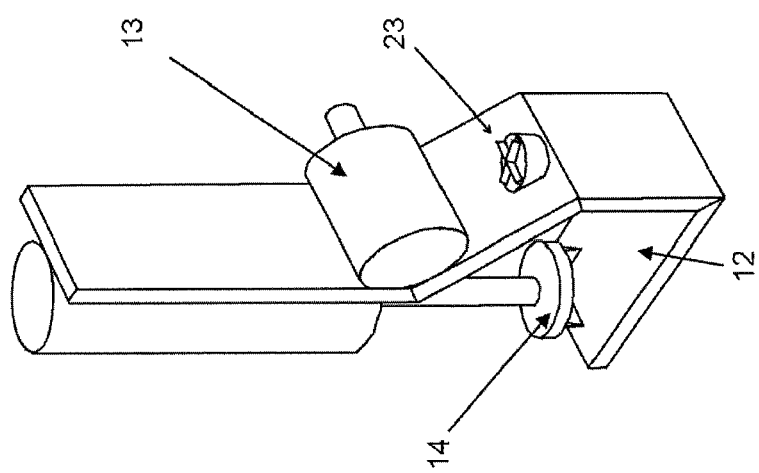
FIG. 2 shows a detail of the apparatus of FIG. 1.

FIG. 2 shows an example implementation of the gripper on an enlarged scale. The gripper is equipped with a pivoted shaft 13 which is attached to the rail 17, 17' for moving on the rail. The gripper comprises a lower plate 12 which grips the lower surface of the front edge of the veneer, and an upper gripping part 14, which can be weighed down against the upper surface of the front edge of the veneer to lock the veneer in place with respect to the gripper. The gripper also comprises a reference point 23 which is distinguished in the image of the camera, thus making it possible to calculate the exact distance between the reference point and the front edge of the veneer.

The apparatus also comprises a baseplate with edge parts 7 and 8 and a center part 6, which are separated from one another by means of grooves formed for the travelling of the grippers. The veneer is moved on the baseplate while the grippers 10, 11 are attached to the front edge 24. The veneer is carried on the baseplate, for example, for approximately ¾ of a cycle and the grippers pull the remaining part in the air as the baseplate retracts.

A camera 4 is arranged to image the position of the veneer at the point shown in FIG. 1 and to guide one of the grippers to travel further than the other gripper to align the veneer, if necessary. The imaging is preferably done with a matrix camera. Imaging the misalignment of the veneer does not require information on the exact imaging moment. After imaging, the location of the veneer with respect to the gripper 10, 11 is known. On the gripper is provided a reference point 23 and the camera 4 is arranged to image the distance between the reference point 23 and, as seen in the feeding direction, the front edge 24 of the veneer 1, on the basis of which distance data, the control system (not shown) comprised in the apparatus is able to guide the gripping means 10, 11 to position the front edge of the veneer precisely in the location desired. To position the end (side edge) 25 of the veneer, the apparatus further comprises a camera 3 for imaging the location of the end, and a motor 20 which drives the shaft 21 in order to move the front end of the rails 17, 17' in the lateral direction. The end of the veneer is positioned once the veneer has fallen from the conveyor onto the baseplate, whereupon the camera 3 takes an image from which the location of the side edge can be detected. After this, the motor 20 is, if necessary, given the instruction to drive the shaft 21 to move the rails 17, 17' so as to move the veneer +/−x mm in the lateral direction. In the embodiment shown, the rails 17, 17' turn on bearings 22 and the minor misalignment which occurs is compensated for by moving the other gripper by as much as is necessary to maintain the front edge of the veneer in the correct position.

The apparatus of FIG. 1 is implemented as a lay-up station. When plywood board or laminated veneer lumber (LVL) is manufactured, the veneers are piled at a lay-up station into veneer assemblies 5 having a thickness of several veneer layers. On the top surface of the veneers is applied glue, with the exception of the topmost layer, and the veneers are placed on top of one another and then fixed permanently to one another under pressure and heat at the following stage. This requires precise positioning of the veneers with respect to one another.

The exact triggering moment of the camera 4 is not crucial, because it is arranged to image separately the location of the reference point 23 of each gripper with respect to the edge 24 of the veneer 1 attached to the gripper (e.g., when the edge of the veneer is 55 mm from the gripper's reference point on the right side and 32 mm on the left side, the gripper is given the command to go to a certain location and the other gripper goes 55−32=23 mm further). The image can be taken at any time after the grippers have gripped the veneer and they still have time to make a veneer straightening movement, because the mutual location of the gripper's reference point and the edge of the veneer no longer changes, while the veneer remains in the gripper's grip the whole time. It is essential to measure the distance between the gripper's reference point and the front edge of the veneer, but the exact location of the reference point with respect to the stationary coordinates is not crucial as such. Real-time calculation of the veneer and the location of the gripper would result in an inaccuracy of several millimeters. Inaccuracies arise, among others, from the exposure moments of the camera, from input and output delays of the control logic and from the handling time itself.

The apparatus according to the present invention can be implemented, for example, by determining the dimensions and shapes of the veneer on the line with a quality control camera and by virtually defining inside the veneer the maximum-sized rectangle which can be obtained from the veneer. When the veneer arrives at the lay-up station, it is gripped by two independent grippers and the location of the corners of the veneer is imaged, for example, by means of a matrix camera for the precise determination of the location and position of the veneer. As the front edge of the veneer for positioning is then used, instead of the real front edge, the virtual front edge (not shown) previously determined on the line, in relation to which the distance of the gripper's reference point is determined. The veneer is then positioned in accordance with the virtual front edge and the veneer is lowered down onto the lay-up station by means of the grippers. The same is repeated for all veneers in the assembly. When one or more assemblies leave for the pre-press, the assembly (assemblies) is cut at the virtual front edge into a real hard front edge, for example, by sawing, water cutting or laser.

The absolute positioning locations of the veneers are not of essential importance as long as all veneers in the same assembly are taken to the same location. The exact location of the grippers for positioning is discovered by means of position transducers (not shown).

The apparatus can also be equipped with photocells, as illustrated in FIGS. 3 and 4, which indicate, as seen in the feeding direction A, the arrival of the front edge 24 of the veneer at each photocell 30, 31. On the basis of this information, the control system (not shown) comprised in the apparatus sends the gripping means 10, 11 or 15, 16 independently of one another to receive the veneer at a certain point in time, which depends on the location of the front edge 24 of the veneer with respect to each gripper, that is, should the veneer arrive on a slant, the different grippers start off at different times and on the basis of this information can be roughly calculated how much the grippers have to straighten the veneer. The straightening can then be started already when the imaging of the front edge is taking place and the straightening can be carried out while the camera calculates the exact extent of the straightening. Once the calculation has been completed, the calculated end point of the movement of the grippers replaces the initial target value calculated by the photocells.

FIG. 3 shows a situation where the front edge of the veneer arrives at the photocells on line 33 on a slant. The distance of the grippers at the starting location on line 32 to the photocells on line 33 is known. The right photocell 30 first gives an indication of the arrival of the front edge 24 of the veneer at it, and on the basis of this information, the corresponding gripper 11 starts off first to grip the veneer on its front edge area. When the front edge of the veneer reaches the second photocell 31, it gives the corresponding indication and the second gripper 10 starts off. FIG. 4 illustrates the guiding of the grippers to straighten the veneer 1. The veneer can be straightened considerably already by the separately controlled starts of the grippers. The locations of the grippers 10, 11 with respect to the front edge of the veneer may deviate from one another. The camera 4 takes an image at a certain point so that the distance of the reference point on the grippers to the front edge 24 of the veneer, or to the virtual front edge, and thus the required degree of straightening, can be calculated accurately. In FIG. 4, the reference markings x1 and x2 describe the distance of the gripper's reference point 23 from the front edge of the veneer 24, and y1, y2 the distance of the reference point from the reference location 35. For example: When x1=25 mm and y1=475 mm, the reference value z1 obtained is 500 mm, by which the gripper 10 moves the front edge of the veneer. Similarly, when x2=20 mm and y2=380 mm, the reference value z2 obtained is 400 mm. When the grippers 10 and 11 have moved the front edge of the veneer in accordance with their respective reference values z1, z2, the front edge of the veneer has been straightened to be essentially straight at reference location 35. The desired positioning point of the front edge in the assembly can be determined as the desired distance from reference location 35.

For imaging by camera, a light source (not shown) is preferably located in such a way that the illumination of the veneers takes place obliquely from above so that the veneer casts a shadow on the already piled veneers, whereupon even a veneer coated with glue is clearly distinguishable from the already piled veneers.

By means of the invention are achieved many advantages, including the following:

positioning is extremely accurate, because the veneer is in control, that is, attached to the grippers the whole time, which means that, for example, wavy veneer does not affect the accuracy.

there may be notches on the front edge, but the camera still detects its positioning location optimally control system delays do not affect accuracy the veneer is supported on a baseplate, thus avoiding breakage, which means that even poor-quality veneers can be handled; the grain direction and the size of the veneer have little significance the apparatus is fast; with double grippers the cycle time achieved can be, for example, 1.5 s/veneer.

veneers are not positioned against a stopper, which is the case with most competing solutions, and the veneer can be braked controllably and thus the veneer is not broken during piling it does not require precise positioning on the line before the lay-up station or other handling station, whereupon a relatively economical line solution is achieved and positioning is carried out controllably (attached to the grippers) as late as possible, and thus there will be no more factors to increase inaccuracy both the front edge and the side edge can be positioned by the same means, whereby the solution is relatively cheap, simple and accurate.

In the foregoing embodiment is described a separately provided particular reference point 23 in the gripping means, but in the solution according to the invention, the reference location can also be, for example, a certain edge of the gripping means or other known point on it, which can be brought clearly in sight in the camera image, thus making it possible to calculate the exact distance between the reference location and the front edge of the veneer.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An apparatus for receiving and positioning veneers fed by a conveyor belt to a position, the apparatus comprising:

grippers for gripping the veneers, at least one gripper being disposed on each side of the feeding direction center line of the veneer and the grippers being configured to be independently movable with respect to each other in the feeding direction; and detection means for detecting one of a location and a position of the veneers on the conveyor belt, wherein the detection means communicate with the grippers and comprise at least a camera, and wherein the grippers are arranged to reciprocate in the feeding direction of the veneers to grip each successive veneer on its leading edge side and to align the leading edge side of the veneer by independent movement of the grippers on each side of the feeding direction center line in the feeding direction, for the veneer to correspond to the position of the veneer in the veneer assembly, in response to information provided by the camera;

wherein the apparatus comprises rails located on both sides of the center line, extending in the feeding direction of the veneers, along which rails the grippers are arranged to move, and that on each rail is formed a first gripper and a second gripper, the first gripper being disposed on a side of the rail, and the second gripper being disposed on an opposing side of the rail, while the grippers are arranged to move in opposite directions so that while one of the first and second gripper is gripping the veneer and moving the veneer forward in the feeding direction, the other gripper on the opposing side of the rail moves in the opposite direction in order to be ready to receive the next veneer.

2. An apparatus as claimed in claim 1, wherein on each gripper is provided a reference location, and that the camera is arranged to detect a distance between the reference location and, as seen in the feeding direction, the leading edge of the veneer, and wherein based on the distance, a control system of the apparatus is configured to guide the grippers to position the leading edge of the veneer in an exact location desired.

3. An apparatus as claimed in claim 2, wherein the reference location is a particular reference point arranged in connection with the grippers.

4. An apparatus as claimed in claim 1, wherein the leading edge of the veneer is a virtual front edge with respect to which the distance is determined and in accordance with which the positioning is carried out.

5. An apparatus as claimed in claim 1, further comprising means for positioning the veneers in a transverse direction with respect to the feeding direction.

6. An apparatus as claimed in claim 5, wherein the transverse positioning means comprise:

a positioning transducer configured to determine an alignment of the veneer sheet in the feeding direction; and a shaft in communication with the positioning transducer and extending in the transverse direction, the shaft being operably engaged with at least two rails, each rail extending in the feeding direction, and wherein at least one of the grippers is operably engaged with and moveable along each rail and the rails being disposed on each side of the feeding direction center line in the feeding direction, the shaft being configured to move the two rails in the transverse direction and the grippers are configured to move along the rails, independently of each other, in the feed direction, in response to the alignment of the veneer sheet determined by the positioning transducer.

7. An apparatus as claimed in claim 1, wherein the camera is a matrix camera.

* * * * *